United States Patent Office 3,068,065
Patented Dec. 11, 1962

3,068,065
METHOD OF REMOVING HYDROGEN SULPHIDE FROM GASES
Wilfred Hartley, Ronald Stewart Craig, and Reuben Hillel Sapiro, all of London England, assignors to Humphreys & Glasgow Limited, London, England, a British company
No Drawing. Filed Aug. 19, 1957, Ser. No. 679,065
Claims priority, application Great Britain Aug. 24, 1956
5 Claims. (Cl. 23—2)

This invention is concerned with the removal of hydrogen sulphide from gases in which it is present as an impurity.

More particularly it refers to hydrogen sulphide removal by washing the gas with a liquor containing iron, the fouled liquor being regenerated by oxidation for re-use.

Processes are known in which the liquor is alkaline and consists essentially of a suspension of oxide, hydrated oxide, or basic carbonate of iron in a solution of sodium or ammonium carbonate and bicarbonate.

In such known processes the hydrogen sulphide dissolved from the gas reacts first with the alkali to form alkali sulphides, which in turn react with the iron in suspension to form iron sulphide. Reaction between soluble sulphides and iron suspension is not instantaneous and since solutions of alkali sulphides exert a partial pressure of hydrogen sulphide, this is opposed to rapid and complete removal of hydrogen sulphide from the gas. The resulting fouled liquor is aerated to oxidise the iron, sulphur being liberated, and the regenerated liquor is then ready for re-use in gas washing.

Further, the effectiveness of the iron suspension in reaction with alkali sulphides, both as regards speed of reaction and also as regards the proportion of the theoretical amount with which it will react, is much affected by variations in the method of its preparation—variations which it is at least difficult in practice to control.

It has been proposed to overcome the foregoing defects by adding certain hydroxy compounds such as glycols and glycerine, and hydroxy acids such as citric acid, tartaric acid or their salts, to preparations of iron hydroxide, these compounds having a solvent or peptising action on the iron hydroxide under neutral or alkaline conditions. A gas-washing liquor thus prepared, however, has the disadvantage of not being easily oxidised for use, and more particularly, for re-use after contact with the foul gas.

Regenerative purification processes of the type described may be also conducted with an aqueous alkaline suspension of iron in which the iron is partly or substantially entirely present in the form of solid complex cyanides, the said complex cyanides being colloidal, or in a coagulated or precipitated condition. Reaction between the alkali sulphides formed and the complex iron cyanides in the suspension results in liberation of sulphur with reduction of ferric iron in the complexes to the ferrous condition. The reduced complexes are then re-oxidised by aeration and the suspension thus regenerated for re-use.

The above reduction and oxidation reactions are faster than the sulphiding and oxidation reactions occurring when iron hydroxide is the reagent for fixing and removing hydrogen sulphide from solution and the aforementioned process therefore has advantages with regard to the extent of removal of hydrogen sulphide from the gas and the size of the plant required, but in both types of process, however, the reagent iron is present as a suspension of solids and is not in solution. As a result there is in all cases an inevitable and sometimes considerable loss of reagent which is associated with the removal from the system, for instance by settling and/or filtration methods, of the sulphur liberated.

In order to obviate the foregoing disadvantages of relatively slow reaction and loss of reagent due to the use of suspended solid reagent, it is necessary to wash the gas with a reagent in solution which will react immediately and quantitatively with the hydrogen sulphide as it is dissolved from the gas or with alkali sulphide which may be formed with any alkali present also in the gas-washing solution.

On that account it is known for instance to use a solution of a zinc salt such as zinc acetate or zinc sulphate for scrubbing hydrogen sulphide from gases, by which means the hydrogen sulphide as it dissolves is very rapidly and completely fixed as zinc sulphide which precipitates out of the gas-washing liquor. By such method therefore a gas may be freed completely from hydrogen sulphide, but there is the great drawback that all zinc reagent must necessarily be removed from the liquor as sulphide for sulphur recovery and for regeneration, which latter cannot be effected by a simple step such as aeration.

It is an object of the present invention to provide a process employing a solution of a reagent for gas-washing, which reagent reacts in solution rapidly and quantitatively with hydrogen sulphide, or with soluble alkali sulphides, and is not removed from the gas-washing liquor for regeneration, being also in solution after regeneration or at all stages in the process, and in which process the spent or partially spent reagent is regenerated by a simple oxidation step, for instance by aeration, sulphur which is liberated during gas-washing or during both stages of the process being removable from the system with negligible loss of reagent.

It is known that certain organic compounds, referred to as chelating agents, will form complexes with various metals, for instance iron, and that the metal in such a complex will remain in solution when the conditions of hydrogen ion concentration and/or the presence of other dissolved salts would otherwise bring about its precipitation. Stability at high temperatures also is a feature of some such complexes, aqueous solutions of which may for instance be boiled without decomposition of the complex and precipitation of the metal.

The production of a complex, or chelate, by reaction of a chelating agent with a metal is considered to involve the formation of one or more ring structures embracing the metal ion, and the stability of chelates has been ascribed to the presence of such ring structures.

The term "chelated iron" is used hereinafter to denote such a complex salt of ferrous or ferric iron.

We have found that solutions of iron complexed with certain chelating agents are reduced to the ferrous condition by hydrogen sulphide and readily re-oxidised to the ferric condition, e.g. by aeration, which, as mentioned hereinbefore, is not the case with previously proposed gas-washing liquors containing iron hydroxide and a substance having a solvent action thereon, such as citric and tartaric acids.

The present invention therefore provides a process for the removal of hydrogen sulphide from gases in which it is present as an impurity either alone or associated with other impurities, in which process the gas is washed with a solution of chelated iron, as hereinbefore defined, in the ferric state, the said chelated iron being able to exist dissolved in the solution in both the ferric and ferrous states, and when in solution being reducible by hydrogen sulphide from the ferric to the ferrous state and readily oxidisable from the ferrous to the ferric state, the said solution, after contact with the impure gas, being regenerated by oxidation for re-use.

Since the chelated iron in the ferrous state is readily oxidised, said oxidation can be effected by aeration with air or oxygen.

Known organic compounds suitable for producing a solution of chelated iron, meeting the above conditions, include amino acids and, more particularly, polyamino polcarboxylic acids in which the amino groups are separated from each other by at least two carbon atoms. In one suitable form, the chelated iron is a complex of iron with an amino acid of the type

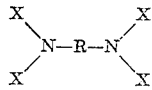

in which at least two of the groups X are selected from the class consisting of acetic acid and propionic acid groups and in which R is an alkyl group with at least two carbon atoms in the chain. Alternatively, R may be cyclohexane, the nitrogen atoms being attached to the ring in the 1.2 (ortho) positions. In another suitable suitable form, R is a benzene ring, the nitrogen atoms being substituted for hydrogen atoms in the 1.2 positions and chlorine or methyl being substituted for hydrogen in at least one of the positions 3 and 6 in the ring.

Specific examples of suitable amino acids are ethylene diamine tetra acetic acid, 1.2-diaminocyclohexane N.N'-tetra acetic acid, di-ethylene triamine penta acetic acid, and N-hydroxyethyl-ethylene diamine-triacetic acid.

Although reference is made above to acids it should be understood that, in actually producing solutions of chelated iron, salts such as alkali metal salts of the acids may be used.

The said solution of chelated iron for washing the gas is preferably prepared by diluting a more concentrated solution of the chelated iron which may be ixidised before the dilution. Oxidation may conveniently be effected by aeration.

The said solution of chelated iron for washing the gas may be alkaline or not as desired, the hydrogen ion with other impurities, in which process the gas is washed concentration being adjusted by addition of bases and/or acids as required at any stage or stages in the preparation and use of the gas-washing solution. The acids and/or bases used may be organic or inorganic or mixtures of both. Suitable organic bases are for instance secondary and tertiary aliphatic amines and amino alcohols.

It is also to be understood that the chelated iron in the gas-washing liquor may, if desired, consist of iron complexed by more than one chelating agent.

The process of the invention may be carried out with absorption of hydrogen sulphide and/or regeneration of the gas-washing solution at atmospheric temperatures and pressures or at temperatures and pressures above atmospheric.

Removal from the process of sulphur formed and liberated may be by settling and/or filtration or by any other known method.

The following are examples of solutions of chelated iron suitable for use with the process of the invention for removal of hydrogen sulphide from impure fuel gases.

(1) 35 grams of crystalline ferrous sulphate ($FeSO_4 \cdot 7H_2O$) is dissolved in 1 litre of water and this solution is poured into another litre of water containing 24 grams of anhydrous sodium carbonate, from 50 to 70 grams of the tetra sodium salt of ethylene-diamine-tetra-acetic acid and from 20 to 100 grams of triethanolamine. The resulting clear mixture is aerated until there is no further darkening colour after which it is diluted either with nine times its own volume of water or with nine times its volume of 0.25 N sodium bicarbonate/carbonate solution (0.20 N bicarbonate, 0.05 N carbonate).

(2) 75 grams of the tetra sodium salt of ethylene-diamine-tetra-acetic acid is dissolved in one litre of water and the hydrogen ion concentration of the solution is adjusted with dilute sulpharic acid to approximately pH 7. To this is added a solution of 35 grams of crystalline ferrous sulphate in one litre of water and the solution is aerated and diluted with nine times its volume of water. The hydrogen ion concentration of the diluted solution is then adjusted to about pH 5.

(3) 35 grams of crystalline ferrous sulphate is dissolved in 1 litre of water and the solution is poured into 1 litre of water containing in solution 62.5 grams of the sodium salt of diethylene-triamine penta-acetic acid at pH 9. The resulting solution is aerated until it contains a high proportion of chelated ferric iron.

(4) 35 grams of crystalline ferrous sulphate is dissolved in 1 litre of water and the solution is poured into 1 litre of water containing in solution 65.2 grams of the tetra sodium salt of cyclohexane 1.2-diamine tetra-acetic acid. The resulting solution is aerated until all the iron is present as chelated ferric iron.

The aerated solutions of Examples 3 and 4 may be used for gas-washing undiluted or diluted with water (e.g. with nine times their volume of water) as desired.

Since the chelated iron is highly soluble in water a considerable range of concentrations of solution is available. For example, using ethylene diamine tetra-acetic acid as the chelating agent, the following more concentrated solution may be prepared:

(5) 174 grams of crystalline ferrous sulphate is dissolved in 1 litre of water. This solution is added to 1 litre of a solution containing 265 grams of ethylene diamine tetra-acetic acid as the tetra sodium salt and 75 grams of triethanolamine. The resulting solution is aerated until all the iron is present as ferric iron in chelate.

This solution can be used undiluted for gas-washing.

As mentioned hereinbefore, chelating agents other than those specified in the preceding specific examples can be used in the process of the present invention. For example, the chelating agent may comprise ethylene diamine tetra propionic acid or 1.2-diaminocyclohexane N.N'-tetra propionic acid.

It will be seen that in all of the above solutions the chelating agent is present in an amount which is at least the stoichiometric equivalent of the iron.

Removal of hydrogen sulphide impurity from a gas with a gas-washing liquor prepared according to the foregoing examples may conveniently be carried out in conventional gas-washing towers, the gas flowing upwards countercurrent to the descending liquor which is sprayed into the top of the towers. Where more than one gas-washing tower is used the gas is passed through the towers in series and thence to further treatment if desired, for instance carbon dioxide removal, and to storage. The liquor from the tower or towers is then aerated, for example by introduction of air through diffusers or by pumping the liquor through air injectors.

Free sulphur formed in the process may then be removed from the aerated liquor by known means, for instance as described in British patent specifications 660,671 and British patent specifications 667,963, followed by settling and filtration of the sludge so obtained. The liquor from the filtration is returned to the gas-washing plant and if desired the separated sulphur may be washed for the recovery of chelated iron.

Where it is convenient to do so, for instance where the impure gas is hot and after removal of hydrogen sulphide is to be subjected to further treatment where heating is required, the hydrogen sulphide removal may be carried out with the gas-washing liquor at temperatures above atmospheric, for instance temperatures in the region of 100° C. The apparatus in that case is adapted and arranged to operate at pressures suitable for efficient absorption of hydrogen sulphide from the hot gas and to prevent boiling of the gas-washing liquor or excessive losses by evaporation.

The hydrogen sulphide removal may be carried out with hot liquor, the spent liquor being cooled and oxidised and then reheated (e.g. by heat exchange with hot spent liquor) for re-use.

The following example of the removal of hydrogen sulphide from coal gas is illustrative of a process according to the present invention.

A stream of coal gas is washed with the solution of chelated iron in the ferric state which solution is prepared according to the previous Example 1. The washing is effected in a conventional gas-washing tower, the gas flowing upwards countercurernt to the descending wash liquor which is sprayed into the top of the tower. By such means the hydrogen sulphide in the coal gas is removed from the gas stream. The wash liquor after passing through the tower is aerated by pumping said solution through air injectors. Free sulphur is formed in this process and the sulphur removed from the liquor by filtration, or any convenient means, for example, as described in British patent specifications Nos. 660,671 and 667,963. The filtered liquor is returned to the gas-washing tower to remove further quantities of hydrogen sulphide from the gas stream. By such means a continuous removal of hydrogen sulphide from the gas stream may be readily effected.

We claim:

1. A process for the removal of hydrogen sulphide from gases in which it is present as an impurity in which process the gas is washed with a solution of iron complexed with a polyamino polycarboxylic acid in which the amino groups are separated from each other by at least two carbon atoms, the iron being in the ferric state for gas-washing, the said solution after contact with the impure gas being regenerated by aeration for re-use.

2. A process as claimed in claim 1 in which the amino acid is of the type

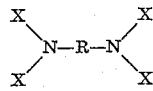

in which at least two of the groups X are selected from the class consisting of acetic acid and propionic acid groups and in which R is an alkyl group with at least two carbon atoms in the chain.

3. A process as claimed in claim 1 in which the amino acid is of the type

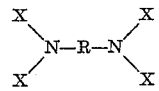

in which at least two of the groups X are selected from the class consisting of acetic acid and propionic acid groups and in which R is cyclohexane, the nitrogen atoms being attached to the ring in the 1.2 (ortho) positions.

4. A process as claimed in claim 1 in which the amino acid is of the type

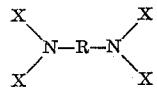

in which at least two of the groups X are selected from the class consisting of acetic acid and propionic acid groups and in which R is a benzene ring, the nitrogen atoms being attached in the 1.2 positions and chlorine being substituted for hydrogen in at least one of the positions 3 and 6 in the ring.

5. A process as claimed in claim 1 in which the amino acid is of the type

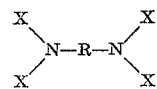

in which at least two of the groups X are selected from the class consisting of acetic acid and propionic acid groups and in which R is a benzene ring, the nitrogen atoms being attached in the 1.2 positions and methyl being substituted for hydrogen in at least one of the positions 3 and 6 in the ring.

References Cited in the file of this patent

UNITED STATES PATENTS

| | | |
|---|---|---|
| 1,854,847 | Kuhn | Apr. 19, 1932 |
| 2,176,441 | Ulrich et al. | Oct. 17, 1939 |
| 2,651,595 | Moulthrop | Sept. 8, 1953 |
| 2,659,691 | Gislon | Nov. 17, 1953 |

OTHER REFERENCES

Mellor: A Comprehensive Treatise on Inorganic and Theoretical Chemistry, Longmans, Green & Co., New York, N.Y., vol. 10, 1930, p. 146.

Jacobson: "Maintenance of Iron Supply in Nutrient Solutions by a Single Addition of Ferric Potassium Ethylenediamine Tetra-Acetate," Plant Physiology, volume 26, No. 2, pp. 411–413, April 1951.